(12) United States Patent
Jiang (10) Patent No.: US 11,706,081 B2
(45) Date of Patent: Jul. 18, 2023

(54) METHOD FOR CONTROLLING BEAM FAILURE RECOVERY PROCEDURE, ELECTRONIC DEVICE AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 234 days.

(21) Appl. No.: 17/286,456

(22) PCT Filed: Oct. 29, 2018

(86) PCT No.: PCT/CN2018/112461
§ 371 (c)(1),
(2) Date: Apr. 17, 2021

(87) PCT Pub. No.: WO2020/087214
PCT Pub. Date: May 7, 2020

(65) Prior Publication Data
US 2021/0392035 A1    Dec. 16, 2021

(51) Int. Cl.
*H04L 41/0654* (2022.01)
*H04W 76/28* (2018.01)
*H04W 52/02* (2009.01)

(52) U.S. Cl.
CPC ..... *H04L 41/0654* (2013.01); *H04W 52/0212* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2019/0089579 A1* | 3/2019 | Sang | H04W 76/27 |
| 2019/0215706 A1* | 7/2019 | Tsai | H04W 74/0833 |
| 2019/0313461 A1* | 10/2019 | Jung | H04W 80/02 |
| 2019/0335522 A1* | 10/2019 | Zhang | H04W 76/27 |
| 2020/0413273 A1* | 12/2020 | Turtinen | H04W 76/18 |
| 2021/0013951 A1* | 1/2021 | Chen | H04W 36/06 |
| 2021/0105171 A1* | 4/2021 | Chen | H04B 7/0695 |

FOREIGN PATENT DOCUMENTS

WO  2018027904 A1  2/2018

OTHER PUBLICATIONS

International Search Report in Application No. PCT/CN2018/112461, dated May 5, 2019.

* cited by examiner

*Primary Examiner* — Benjamin Lamont
(74) *Attorney, Agent, or Firm* — Syncoda LLC; Feng Ma (57) ABSTRACT

A method for controlling a beam failure recovery procedure includes: starting a beam failure detection timer after beam failure is determined; triggering a beam failure recovery BEF procedure after the beam failure is determined; monitoring whether the beam failure detection timer times out after the BRF procedure is triggered and before the BRF procedure completes; canceling or stopping the BRF procedure when the beam failure detection timer times out.

10 Claims, 11 Drawing Sheets

METHOD FOR CONTROLLING BEAM FAILURE RECOVERY PROCEDURE, ELECTRONIC DEVICE AND STORAGE MEDIUM

CROSS-REFERENCE TO RELATED APPLICATIONS

This application is a national stage of International Application No. PCT/CN2018/112461 filed on Oct. 29, 2018, the disclosure of which is hereby incorporated by reference in its entirety.

TECHNICAL FIELD

The present disclosure relates to a field of communication technologies, and particularly to a method and an apparatus for controlling a beam failure recovery procedure.

BACKGROUND

In related art, user equipment (UE) often requires to monitor signal quality of a beam signal. When the signal quality is poor, beam failure is determined. After a certain number of beam failures, a beam failure recovery (BFR) procedure is triggered. Execution of the BFR procedure may be delayed. Before executing the BFR procedure, or during executing the BFR procedure, when the signal quality is good, the UE will still continue to execute the BFR procedure. At this time, the UE does not require to execute the BFR procedure, and continuing to execute the BFR procedure may increase power consumption of the UE and occupy more network resources.

SUMMARY

The present disclosure provides a method and an apparatus for controlling a beam failure recovery procedure. The technical solution as follows:

According to a first aspect of embodiments of the present disclosure, a method for controlling a beam failure recovery procedure is provided, and includes: start a beam failure detection timer after beam failure is determined; trigger a beam failure recovery BEF procedure after the beam failure is determined; monitoring whether the beam failure detection timer times out after the BRF procedure is triggered and before the BRF procedure completes; canceling or stopping the BRF procedure when the beam failure detection timer times out.

The technical solution provided in embodiments of the present disclosure may include the following beneficial effects: the BRF procedure may be actively canceled or stopped when the beam failure detection timer times out, thereby saving power consumption of a UE and network resources.

In an embodiment, the UE is in a discontinuous reception (DRX) inactive state. The method further includes: determining to delay execution of the BRF procedure after the BRF procedure is triggered; monitoring whether the beam failure detection timer times out after the BRF procedure is triggered and before the BRF procedure completes includes: monitoring whether the beam failure detection timer times out during delaying execution of the BRF procedure; canceling or stopping the BRF procedure when the beam failure detection timer times out includes: canceling the BRF procedure when the beam failure detection timer times out.

The technical solution provided in embodiments of the present disclosure may include the following beneficial effects: in this embodiment, after the BRF procedure is triggered, the procedure may not be executed immediately, and during the delay process, it may be monitored whether the beam failure detection timer times out. The BRF procedure may be actively canceled or stopped when the beam failure detection timer times out, thereby saving the power consumption of the UE and the network resources.

In an embodiment, the UE is in a DRX inactive state. The method further includes: determining to delay execution of the BRF procedure after the BRF procedure is triggered; monitoring whether the beam failure detection timer times out after the BRF procedure is triggered and before the BRF procedure completes includes: monitoring whether the beam failure detection timer times out during executing the BRF procedure; canceling or stopping the BRF procedure when the beam failure detection timer times out includes: stopping the BRF procedure when the beam failure detection timer times out.

The technical solution provided in embodiments of the present disclosure may include the following beneficial effects: in this embodiment, after the BRF procedure is triggered, the procedure may be not executed immediately. It may be monitored whether the beam failure detection timer times out during executing the BRF procedure. The BRF procedure may be actively canceled or stopped when the beam failure detection timer times out, thereby saving the power consumption of the UE and the network resources.

In an embodiment, the method further includes: executing the BRF procedure immediately after the BRF procedure is triggered; monitoring whether the beam failure detection timer times out after the BRF procedure is triggered and before the BRF procedure completes includes: monitoring whether the beam failure detection timer times out during executing the BRF procedure; canceling or stopping the BRF procedure when the beam failure detection timer times out includes: stopping the BRF procedure when the beam failure detection timer times out.

The technical solution provided in embodiments of the present disclosure may include the following beneficial effects: in this embodiment, after the BRF procedure is triggered, the procedure may be executed immediately. It may be monitored whether the beam failure detection timer times out during executing the BRF procedure. The BRF procedure may be actively canceled or stopped when the beam failure detection timer times out, thereby saving the power consumption of the UE and the network resources.

In an embodiment, the method further includes: starting the beam failure recovery timer when the BEF procedure starts to be executed; and closing the beam failure recovery timer when the BEF procedure stops.

The technical solution provided in embodiments of the present disclosure may include the following beneficial effects: in the embodiments, the beam failure recovery timer may be actively closed when the BRF procedure is stopped, thereby saving power consumption of equipment.

According to a second aspect of embodiments of the present disclosure, an apparatus for controlling a beam failure recovery procedure is provided and applied to a UE side, and includes: a first starting module, configured to start a beam failure detection timer after beam failure is determined; a triggering module, configured to trigger a beam failure recovery BEF procedure after the beam failure is determined; a monitoring module, configured to monitor whether a beam failure detection timer times out after the BRF procedure is triggered and before the BRF procedure completes; and a controlling module, configured to cancel or stop the BRF procedure when the beam failure detection timer times out.

In an embodiment, the UE is in a discontinuous reception (DRX) inactive state; the apparatus further includes: a determining module, configured to determine to delay execution of the BRF procedure after the BRF procedure is triggered; the monitoring module includes: a first monitoring submodule, configured to monitor whether the beam failure detection timer times out during delaying the execution of the BRF procedure; the controlling module includes: a first controlling submodule, configured to cancel the BRF procedure when the beam failure detection timer times out.

In an embodiment, the UE is in a discontinuous reception (DRX) inactive state; the apparatus further includes: a determining module, configured to determine to delay execution of the BRF procedure after the BRF procedure is triggered; the monitoring module includes: a second monitoring submodule, configured to monitor whether the beam failure detection timer times out during executing the BRF procedure; the controlling module includes: a second controlling submodule, configured to stop the BRF procedure when the beam failure detection timer times out.

In an embodiment, the apparatus further includes: an executing module, configured to execute the BRF procedure immediately after the BRF procedure is triggered; the monitoring module includes: a second monitoring submodule, configured to monitor whether the beam failure detection timer times out during executing the BRF procedure; the controlling module includes: a second controlling submodule, configured to stop the BRF procedure when the beam failure detection timer times out.

In an embodiment, the apparatus further includes: a second starting module, configured to start the beam failure recovery timer when the BEF procedure starts to be executed; and a closing module, configured to close the beam failure recovery timer when stopping the BEF procedure.

According to a third aspect of embodiments of the present disclosure, an apparatus for controlling a beam failure recovery procedure is provided, and includes: a processor; and a memory configured to store instructions executable by the processor; the processor is configured to: start a beam failure detection timer after beam failure is determined; trigger a beam failure recovery BEF procedure after the beam failure is determined; monitor whether the beam failure detection timer times out after the BRF procedure is triggered and before the BRF procedure completes; and cancel or stop the BRF procedure when the beam failure detection timer times out.

According to a fourth aspect of embodiments of the present disclosure, a computer readable storage medium with a computer instruction stored thereon, in which the instruction implements the method according to the above embodiments when executed by the processor.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

In related art, in a mobile communication system, a UE may often monitor signal quality of a set of beams. When the signal quality monitored does not meet a preset quality requirement, a physical layer in the UE may indicate beam failure to a Media Access Control (MAC) layer in the UE. After a certain number of beam failures, the MAC layer may trigger a beam failure recovery (BFR) procedure to request a network side to configure another set of beams for the UE to monitor the signal quality, so that the UE may perform channel switch in future.

It can be found that, after a certain number of the beam failures, the BFR procedure may be triggered, but may not be executed immediately. For example, after a UE in a discontinuous reception (DRX) inactive state (for example, in a DRX off state) triggers the BFR procedure, the BFR procedure may not be executed immediately, that is, with a certain delay, and the BFR procedure may be executed before the UE is in an active state (for example, in a DRX on state). The system has pre-configured a switch cycle between the inactive state and the active state, therefore the UE may know how many milliseconds it will take to be switched to the active state. Or, the UE may know when it will be switched to the active state based on its own services situation. During delaying execution of the BFR procedure, the UE may continue to monitor the signal quality. In this process, the signal quality may turn good, but the BFR procedure will still be executed when the delay is over. It can be seen that, a purpose of executing the BFR procedure is to monitor another set of possibly good quality beams; when the quality of the current beams turns good, it is not required to execute the BFR procedure again. The process of executing the BFR procedure may increase power consumption of equipment and waste network resources.

Similarly, it also takes some time to execute the BFR procedure. In the process of executing the BFR procedure, the signal quality may turn good, but the BFR procedure will continue to complete at this time. Obviously, it is not required to continue to execute the BFR procedure again. The process of executing the BFR procedure may increase the power consumption of the equipment and waste the network resources.

In order to solve the above problems, in this embodiment, after the BRF procedure is triggered and before the BRF procedure completes, when the beam failure detection timer times out, the BFR procedure will be actively canceled or stopped, to save power consumption of the equipment and the network resources.

Figure 1:
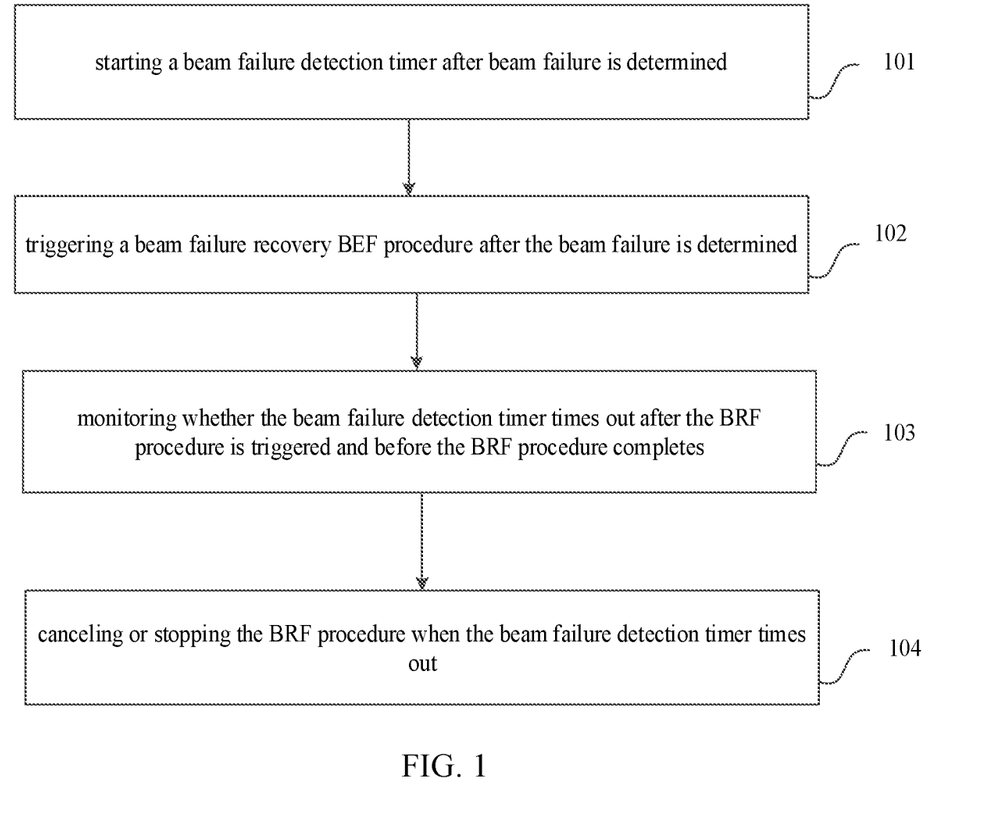
FIG. 1 is a flowchart illustrating a method for controlling a beam failure recovery procedure according to an example embodiment.

FIG. 1 is a flowchart illustrating a method for controlling a beam failure recovery procedure according to an example embodiment. The method for controlling a beam failure recovery procedure is applied to a UE, which may be a mobile phone, a computer, a digital broadcasting terminal, a messaging device, a game console, a tablet device, medical equipment, fitness equipment, a personal digital assistant, etc. As illustrated in FIG. 1, the method may include the following blocks 101-104.

At block 101, a beam failure detection timer is started after beam failure is determined.

At block 102, a beam failure recovery BEF procedure is triggered after the beam failure is determined.

At block 103, whether the beam failure detection timer times out is monitored after the BRF procedure is triggered and before the BRF procedure completes.

At block 104, the BRF procedure is canceled or stopped when the beam failure detection timer times out.

In this embodiment, when the beam failure is determined after currently testing for the signal quality of the beams, the beam failure detection timer is restarted. At the same time, continuous times of the beam failures are counted, and when the counting result reaches a preset times threshold (such as 2 or 3 times), the BRF procedure is triggered to request the network side to reallocate a new set of beams. Triggering the BRF procedure is basically simultaneous with last restarting of the beam failure detection timer. In this embodiment, it still monitors whether the beam failure detection timer times out after the BFR procedure is triggered. When the beam failure detection timer times out, in response to the BFR procedure being not executed, the BFR procedure will be canceled; in response to the BFR procedure having been executed but being not completed, the BFR procedure will be stopped. In this way, the power consumption of the UE is reduced and the network resources are saved.

In an embodiment, the UE is in a discontinuous reception (DRX) inactive state.

The method further includes: determining to delay execution of the BRF procedure after the BRF procedure is triggered; monitoring whether the beam failure detection timer times out after the BRF procedure is triggered and before the BRF procedure completes includes: monitoring whether the beam failure detection timer times out during delaying execution of the BRF procedure; canceling or stopping the BRF procedure when the beam failure detection timer times out includes: canceling the BRF procedure when the beam failure detection timer times out.

Figure 2:
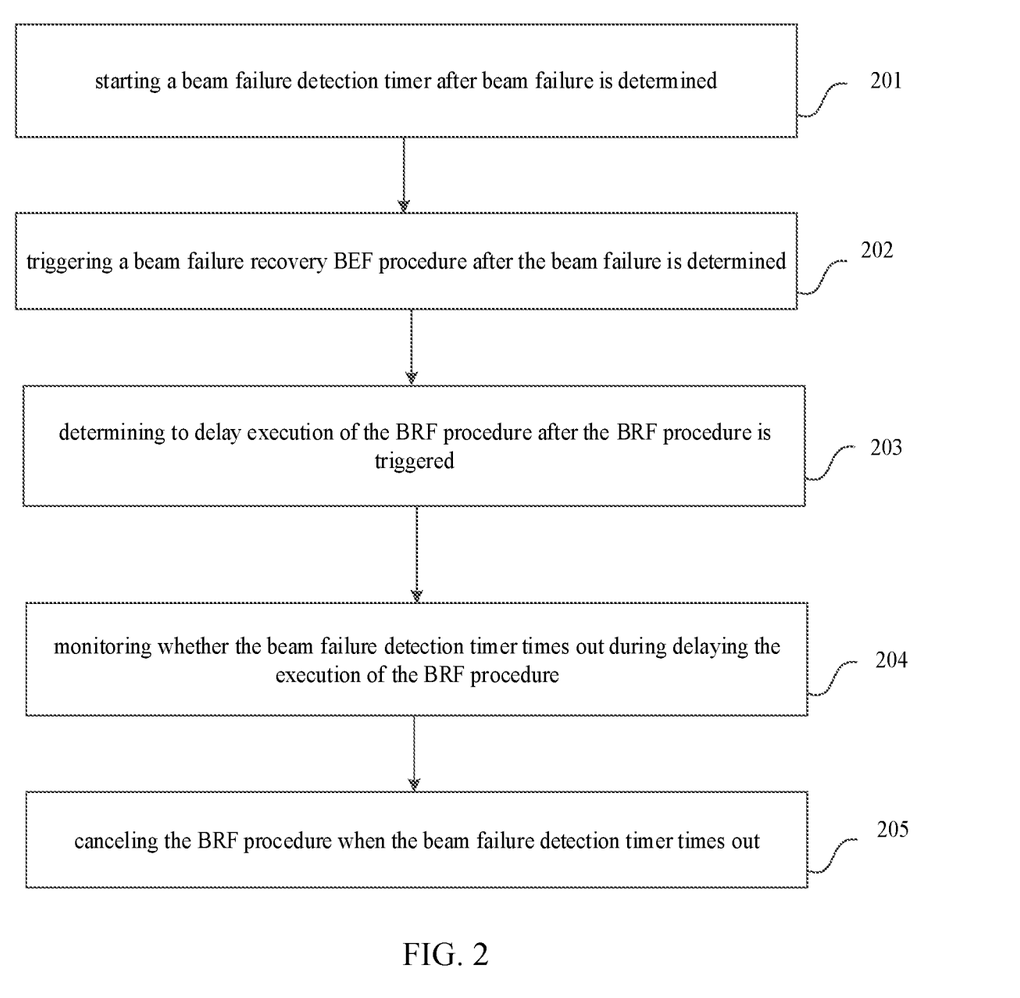
FIG. 2 is a flowchart illustrating a method for controlling a beam failure recovery procedure according to an example embodiment.

FIG. 2 is a flowchart illustrating a method for controlling a beam failure recovery procedure.

At block 201, a beam failure detection timer is started after beam failure is determined.

At block 202, a beam failure recovery BEF procedure is triggered after the beam failure is determined.

At block 203, it is determined to delay execution of the BRF procedure after the BRF procedure is triggered.

At block 204, whether the beam failure detection timer times out is monitored during delaying the execution of the BRF procedure.

At block 205, the BRF procedure is canceled when the beam failure detection timer times out.

In an embodiment, the UE in the DRX inactive state may select to delay the execution of the BRF procedure after the BRF procedure is triggered, and execute the BRF procedure before switching to a DRX active state. When determining to delay the execution of the BRF procedure, in the process of delaying execution of the BRF procedure, the embodiment still monitors whether the beam failure detection timer times out. When the beam failure detection timer times out, it is determined that the signal quality of the beam has turned good and it is not required to execute the BRF procedure, the BRF procedure will be actively canceled, to save the power consumption of the equipment and the network resources.

In an embodiment, the UE is in a discontinuous reception (DRX) inactive state.

The method further includes: determining to delay execution of the BRF procedure after the BRF procedure is triggered; monitoring whether the beam failure detection timer times out after the BRF procedure is triggered and before the BRF procedure completes includes: monitoring whether the beam failure detection timer times out during executing the BRF procedure; canceling or stopping the BRF procedure when the beam failure detection timer times out includes: stopping the BRF procedure when the beam failure detection timer times out.

Figure 3:
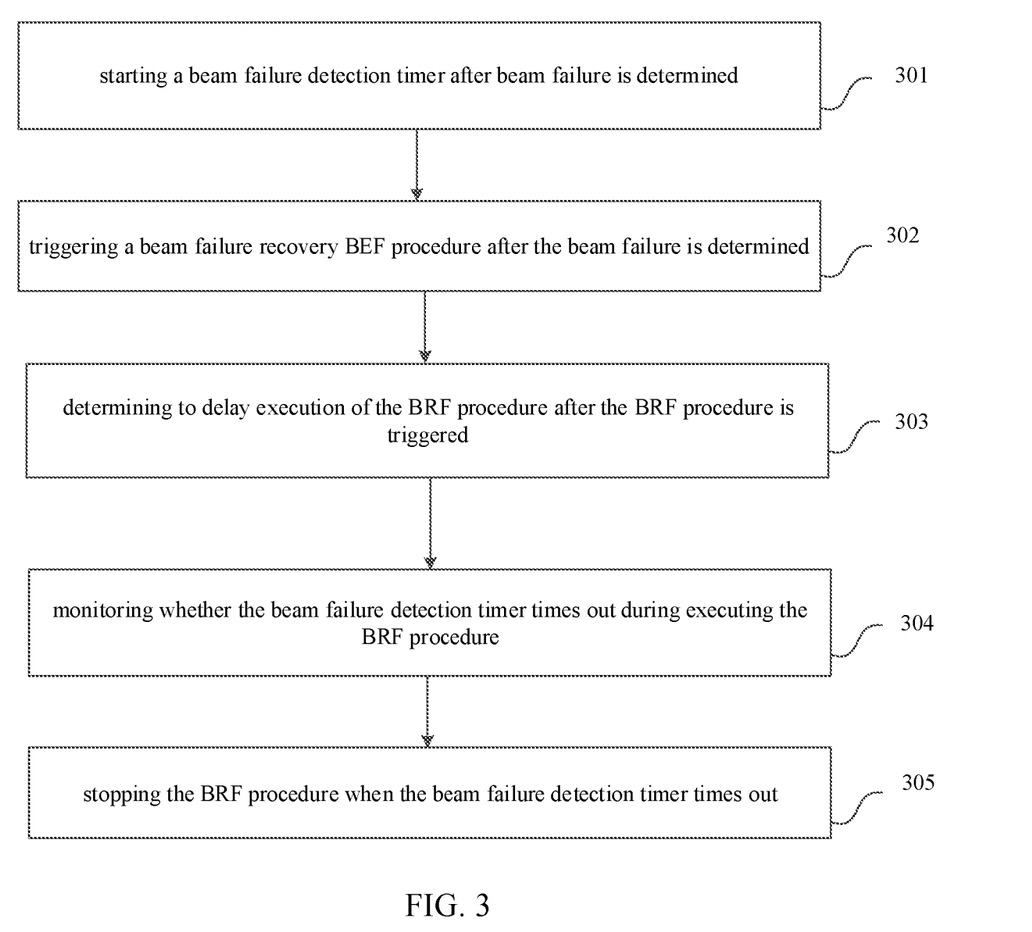
FIG. 3 is a flowchart illustrating a method for controlling a beam failure recovery procedure according to an example embodiment.

FIG. 3 is a flowchart illustrating a method for controlling a beam failure recovery procedure.

At block 301, a beam failure detection timer is started after beam failure is determined.

At block 302, a beam failure recovery BEF procedure is triggered after the beam failure is determined.

At block 303, it is determined to delay execution of the BRF procedure after the BRF procedure is triggered.

At block 304, whether the beam failure detection timer times out is monitored during executing the BRF procedure.

At block 305, the BRF procedure is stopped when the beam failure detection timer times out.

In an embodiment, the UE in the state of the DRX being inactive, may select to delay the execution of the BRF procedure after the BRF procedure is triggered, and execute the BRF procedure before switching to a DRX active state. When a delay duration is reached, the BRF procedure starts to be executed. The embodiment still monitors whether the beam failure detection timer times out during executing the BRF procedure. When the beam failure detection timer times out, it is determined that the signal quality of the beam has turned good and it is not required to execute the BRF procedure, the BRF procedure will be actively stopped, to save the power consumption of the equipment and the network resources.

The BRF procedure is a random access procedure configured to request the network side to reallocate a set of beams. For example, for a 5G system, taking the random access procedure based on competition as an example, the UE sends a random access message 1, which is equivalent to starting the execution of the BRF procedure. Before the UE sends a random access message 3, when the beam failure detection timer times out, the UE cancels sending the message 3, which is equivalent to stopping the BRF procedure.

For another example, for the 5G system, taking a random access procedure based on non-competition as an example, the UE sends the random access message 1, which is equivalent to starting the execution of the BRF procedure. Before the UE receives a random access message 2, when the beam failure detection timer times out, the UE cancels receiving the message 2, and also ignores the message even if the message 2 arrives later, which is equivalent to stopping the BRF procedure.

In an embodiment, the method further includes: executing the BRF procedure immediately after the BRF procedure is triggered; monitoring whether the beam failure detection timer times out after the BRF procedure is triggered and before the BRF procedure completes includes: monitoring whether the beam failure detection timer times out during executing the BRF procedure; canceling or stopping the BRF procedure when the beam failure detection timer times out includes: stopping the BRF procedure when the beam failure detection timer times out.

Figure 4:
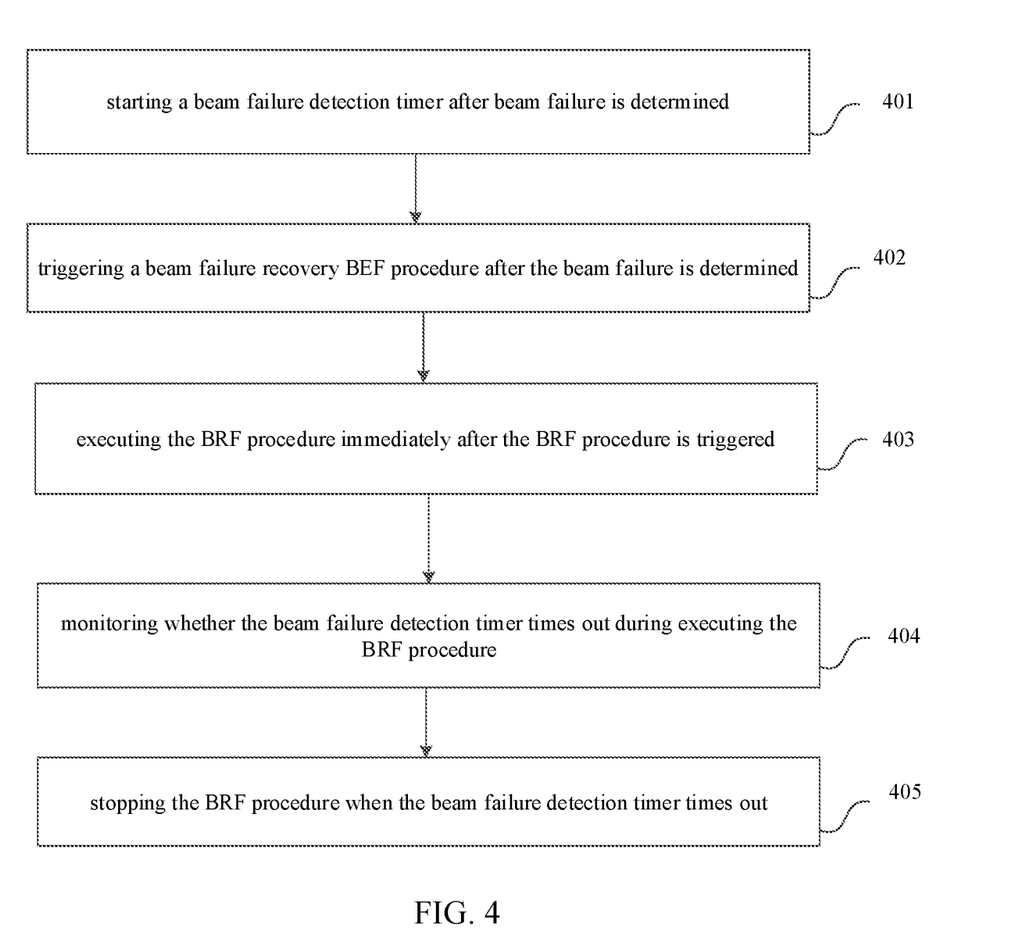
FIG. 4 is a flowchart illustrating a method for controlling a beam failure recovery procedure according to an example embodiment.

FIG. 4 is a flowchart illustrating a method for controlling a beam failure recovery procedure.

At block 401, a beam failure detection timer is started after beam failure is determined.

At block 402, a BEF procedure is triggered after the beam failure is determined.

At block 403, the BRF procedure is executed immediately after the BRF procedure is triggered.

At block 404, whether the beam failure detection timer times out is monitored during executing the BRF procedure.

At block 405, the BRF procedure is stopped when the beam failure detection timer times out.

In this embodiment, no matter the UE is in a DRX inactive state or in a DRX active state, after the BRF procedure is triggered, the BRF procedure may be executed immediately. This embodiment still monitors whether the beam failure detection timer times out in during executing the BRF procedure. When the beam failure detection timer times out, it is determined that the signal quality of the beam has turned good and it is not required to execute the BRF procedure, the BRF procedure is actively stopped, so as to save the power consumption of the equipment and the network resources.

For example, for the 5G system, the UE sends the random access message 1, which is equivalent to starting the execution of the BRF procedure. An unlicensed frequency band of 5G requires to follow a principle of Listen before Talk (LBT). Before the UE sends the random access message 1, it is required to detect whether time-frequency resources corresponding to the message 1 are occupied. The UE first detects whether the time-frequency resources are occupied, equivalent to starting the execution of the BRF procedure. Taking a random access procedure based on competition as an example, before the UE receives a random access message 4, when the beam failure detection timer times out, the BRF procedure is actively stopped.

In an embodiment, the method further includes: starting the beam failure recovery timer when the BEF procedure starts to be executed; closing the beam failure recovery timer when the BEF procedure stops.

In this embodiment, when the BRF procedure starts to be executed, the beam failure recovery timer may be started, so as to time the BRF procedure. The beam failure recovery timer is actively closed when the BEF procedure stops, so as to save the power consumption of the equipment and avoid other problems.

The above embodiments may make free combination according to actual requirements.

The below are apparatus embodiments of the present disclosure, which may be configured to execute method embodiments of the present disclosure.

Figure 5:
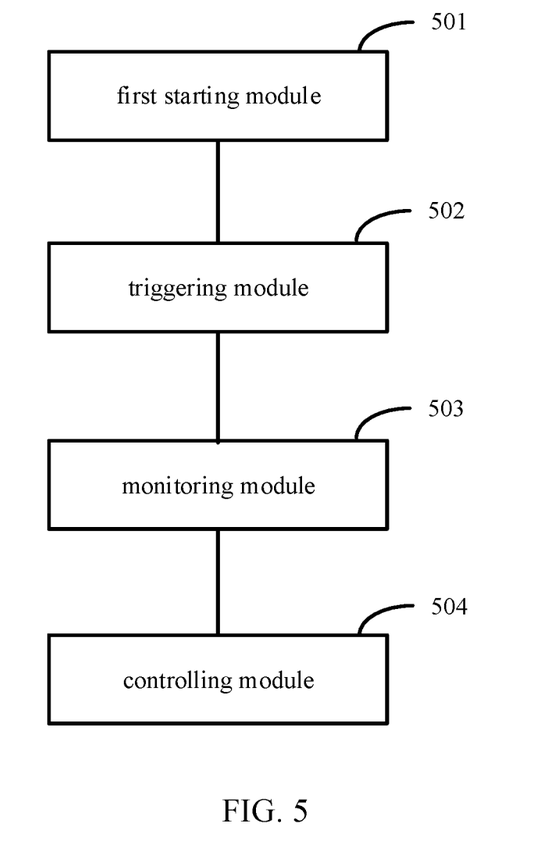
FIG. 5 is a block diagram illustrating an apparatus for controlling a beam failure recovery procedure according to an example embodiment.

FIG. 5 is a block diagram illustrating an apparatus for controlling a beam failure recovery procedure according to an example embodiment. The apparatus may be a part or all of an electronic device through a software, a hardware or their combination.

Referring to FIG. 5, the apparatus for controlling a beam failure recovery procedure includes a first starting module 501, a triggering module 502, a monitoring module 503 and a controlling module 504.

The first starting module 501 is configured to start a beam failure detection timer after beam failure is determined.

The triggering module 502 is configured to trigger a beam failure recovery BEF procedure after the beam failure is determined.

The monitoring module is configured to monitor whether a beam failure detection timer times out after the BRF procedure is triggered and before the BRF procedure completes.

The controlling module 504 is configured to cancel or stop the BRF procedure when the beam failure detection timer times out.

In an embodiment, the UE is in a discontinuous reception (DRX) inactive state.

Figure 6:
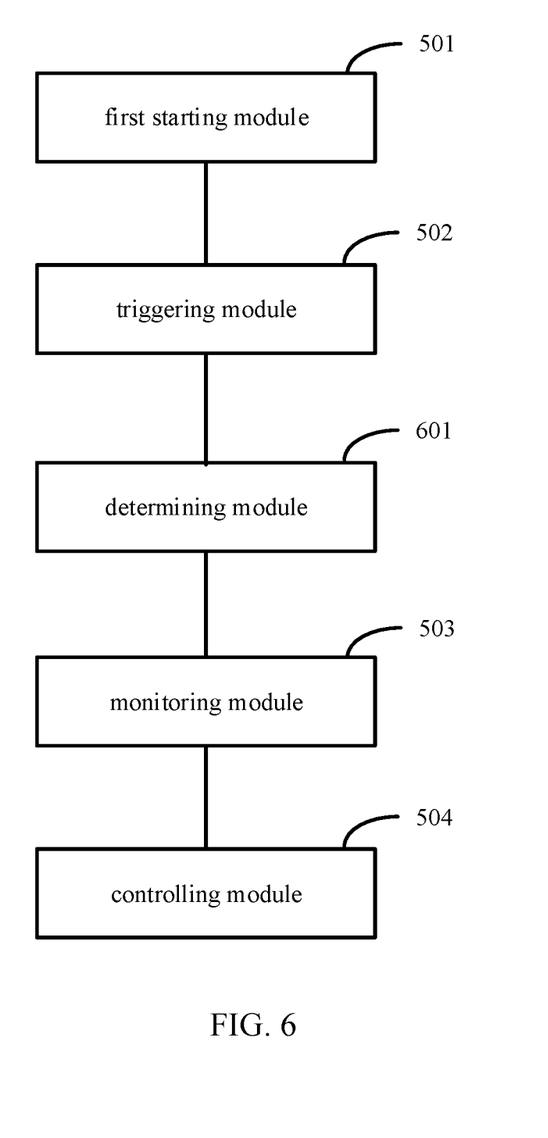
FIG. 6 is a block diagram illustrating an apparatus for controlling a beam failure recovery procedure according to an example embodiment.

As shown in FIG. 6, the apparatus further includes a determining module 601.

Figure 7:
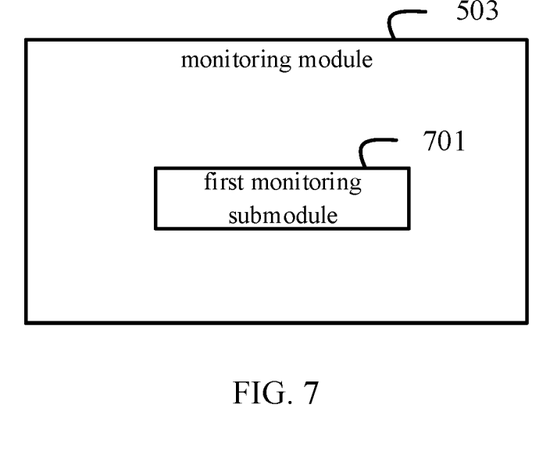
FIG. 7 is a block diagram illustrating a monitoring module according to an example embodiment.

The determining module 601 is configured to determine to delay execution of the BRF procedure after the BRF procedure is triggered;

As shown in FIG. 7, the monitoring module 503 includes a first monitoring submodule 701.

Figure 8:
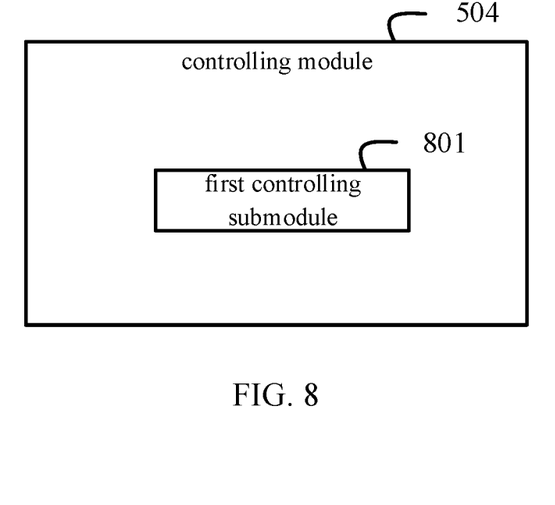
FIG. 8 is a block diagram illustrating a controlling module according to an example embodiment.

The first monitoring submodule 701 is configured to monitor whether the beam failure detection timer times out during delaying the execution of the BRF procedure;

As shown in FIG. 8, the controlling module 504 includes: a first controlling submodule 801.

The first controlling submodule 801 is configured to cancel the BRF procedure when the beam failure detection timer times out.

In an embodiment, the UE is in a discontinuous reception (DRX) inactive state.

The apparatus further includes a determining module 601.

The determining module 601 is configured to determine to delay execution of the BRF procedure after the BRF procedure is triggered.

Figure 9:
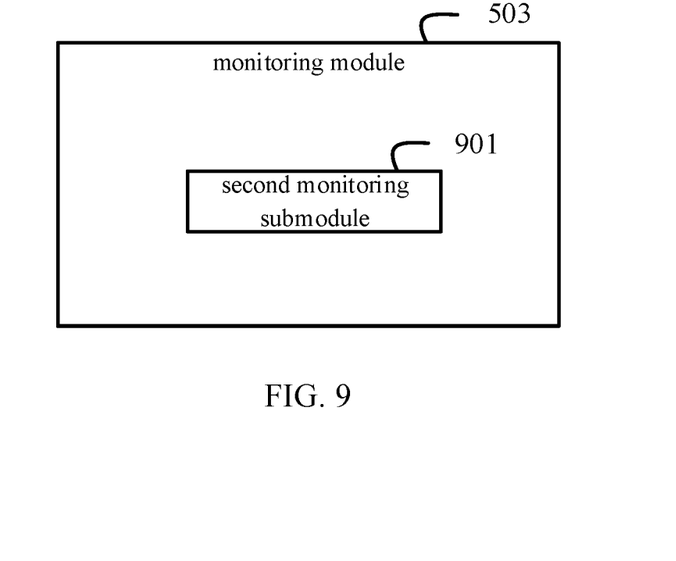
FIG. 9 is a block diagram illustrating a monitoring module according to an example embodiment.

As shown in FIG. 9, the monitoring module 503 includes a second monitoring submodule 901.

The second monitoring submodule 901 is configured to monitor whether the beam failure detection timer times out during executing the BRF procedure.

Figure 10:
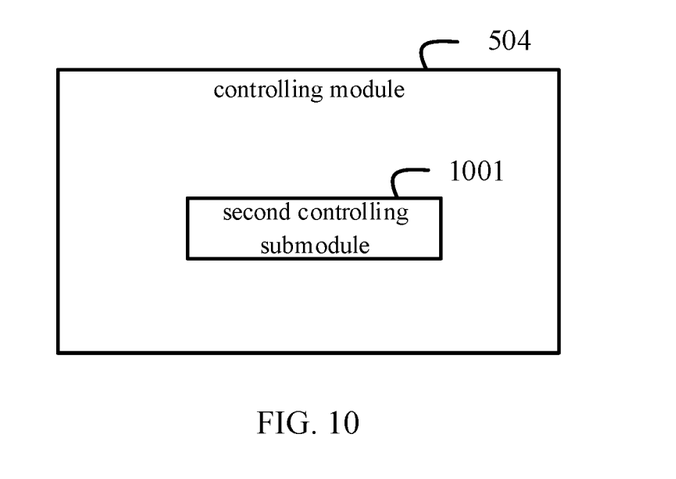
FIG. 10 is a block diagram illustrating a monitoring module according to an example embodiment.

As shown in FIG. 10, the controlling module 504 includes a second controlling submodule 1001.

The second controlling submodule 1001 is configured to stop the BRF procedure when the beam failure detection timer times out.

Figure 11:
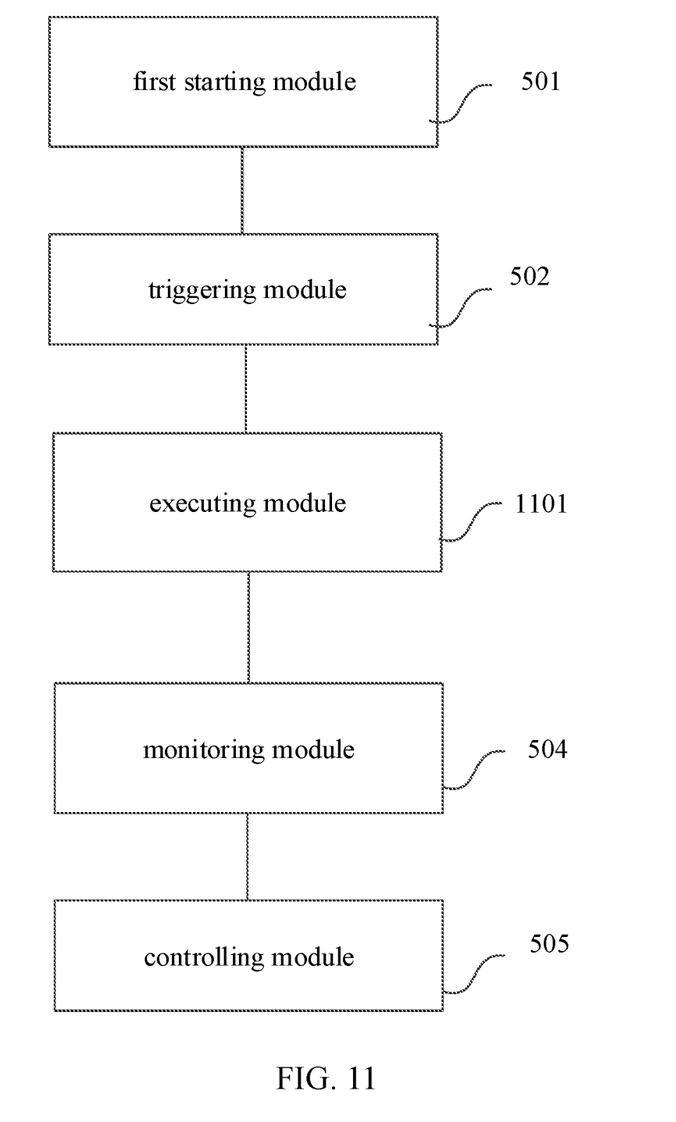
FIG. 11 is a block diagram illustrating an apparatus for controlling a beam failure recovery procedure according to an example embodiment.

In an embodiment, as shown in FIG. 11, the apparatus further includes an execution module 1101.

The executing module 1101 is configured to execute the BRF procedure immediately after the BRF procedure is triggered.

The monitoring module 503 includes a second monitoring submodule 901.

The second monitoring submodule 901 is configured to monitor whether the beam failure detection timer times out during executing of the BRF procedure.

The controlling module 504 includes a second controlling submodule 1001.

The second controlling submodule 1001 is configured to stop the BRF procedure when the beam failure detection timer times out.

Figure 12:
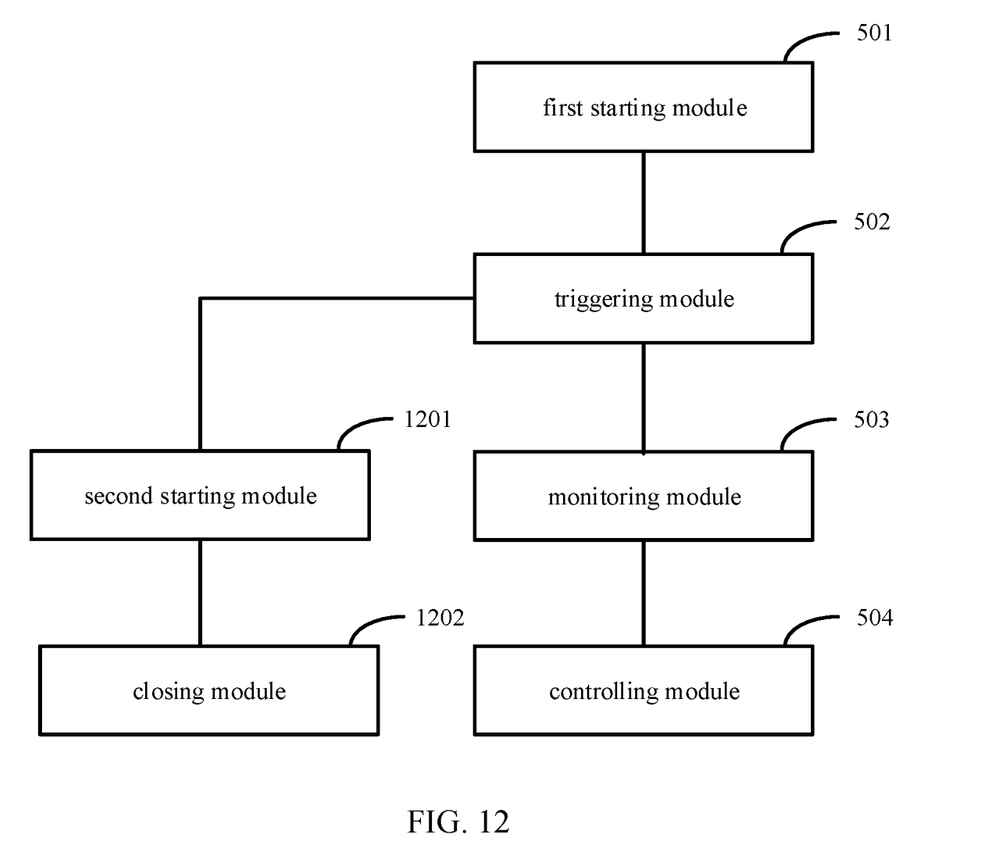
FIG. 12 is a block diagram illustrating an apparatus for controlling a beam failure recovery procedure according to an example embodiment.

In an embodiment, as shown in FIG. 12, the apparatus further includes a second starting module 1201 and a closing module 1202.

The second starting module 1201 is configured to start the beam failure recovery timer when the BEF procedure starts to be executed.

The closing module 1201, is configured to close the beam failure recovery timer when the BEF procedure stops.

With regard to the apparatus in the above embodiments, the specific way in which each module performs the operation has been described in detail in embodiments of the method and will not be elaborated here.

Figure 13:
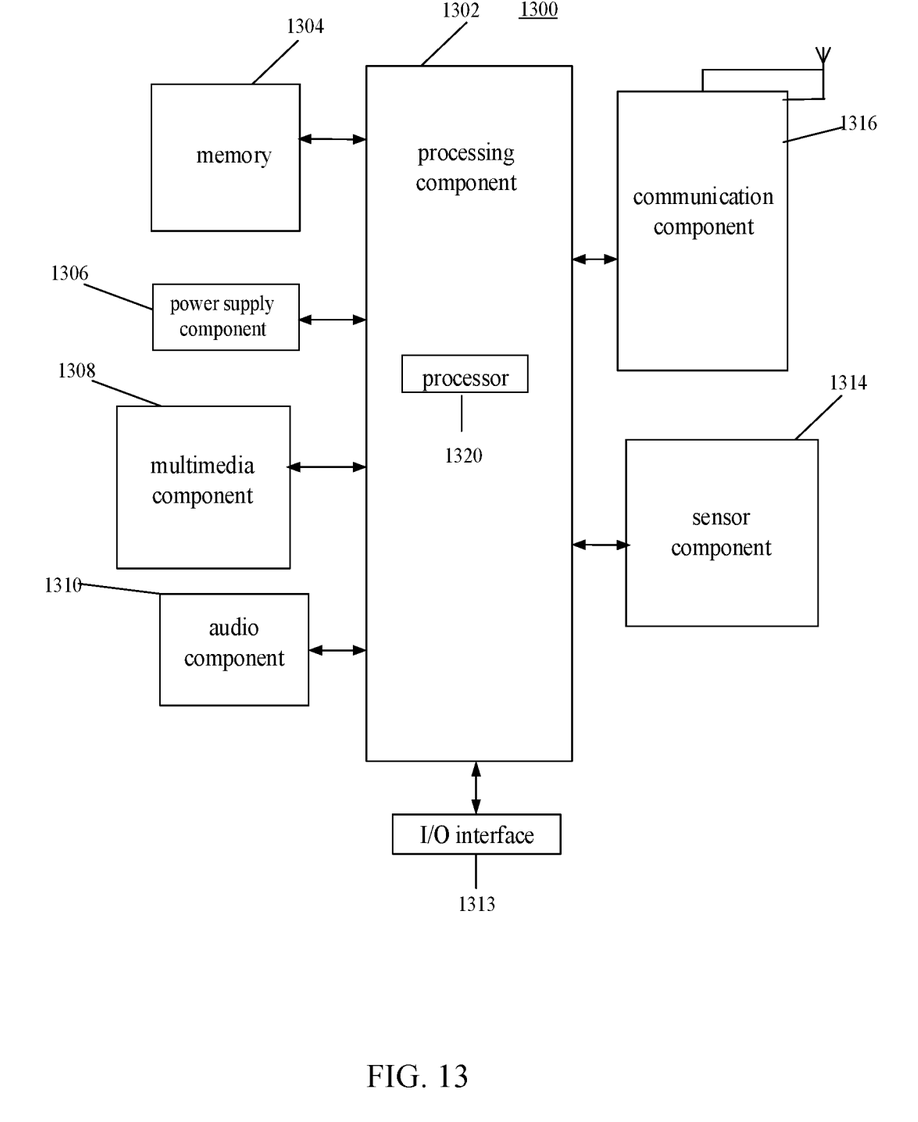
FIG. 13 is a block diagram illustrating an apparatus suitable for controlling a beam failure recovery procedure according to an example embodiment.

FIG. 13 is a block diagram illustrating an apparatus suitable for controlling a beam failure recovery procedure according to an example embodiment. For example, an apparatus 1300 may be a mobile phone, a computer, a digital broadcasting terminal, a messaging device, a game console, a tablet device, a medical equipment, a fitness equipment, a personal digital assistant, etc.

The apparatus 1300 may include one or more components: a processing component 1302, a memory 1304, a power supply component 1306, a multimedia component 1308, an audio component 1310, an input/output (I/O) interface 1313, a sensor component 1314, and a communication component 1316.

The processing component 1302 generally controls the whole operation of the apparatus 1300, such as the operations related to display, phone call, data communication, camera operation and recording operation. The processing component 1302 may include one or more processors 1320 to execute instructions, to complete all or part of blocks of the above methods. In addition, the processing component 1302 may include one or more modules for the convenience of interaction between the processing component 1302 and other components. For example, the processing component 1302 may include a multimedia module for the convenience of interaction between the multimedia component 1308 and the processing component 1302.

The memory 1304 is configured to store all types of data to support the operation of the apparatus 1300. Examples of the data include the instructions of any applications or methods operated on apparatus 1300, contact data, phone book data, messages, pictures, videos, etc. The memory 1304 may be implemented by any type of volatile or non-volatile storage devices or their combination, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a Magnetic Memory, a Flash Memory, a Magnetic Disk or an Optical Disk.

The power supply component 1306 may provide power supply for all components of the apparatus 1300. The power supply component 1306 may include a power supply management system, one or more power supplies, and other components related to generating, managing and distributing power for the apparatus 1900.

The multimedia component 1308 includes an output interface screen provided between the apparatus 1300 and the user. In some embodiments, a screen may include a liquid crystal display (LCD) and a touch panel (TP). If the screen includes a touch panel, the screen may be implemented as a touch screen to receive input signals from the user. The touch panel includes one or more touch sensors to sense touching, sliding and gestures on the touch panel. The touch sensor may not only sense the boundary of touching or sliding action, but also detect the duration and pressure related to the touching or sliding operation. In some embodiments, the multimedia component 1308 includes a front camera and/or a rear camera. When the apparatus 1300 is in operation mode, such as shooting mode or video mode, the front camera or the rear camera may receive the external multimedia data. Each front camera and rear camera may be a fixed optical lens system or an optical lens system with focal length and optical zoom capacity.

The audio component 1310 is configured as an output and/or input signal. For example, the audio component 1310 includes a microphone (MIC). When the apparatus 1300 is in operation mode, such as call mode, record mode, and speech recognition mode, the microphone is configured to receive external audio signals. The audio signals received may be further stored in the memory 1304 or sent via the communication component 1316. In some embodiments, the audio component 1310 further includes a speaker configured to an output audio signal.

An I/O interface 1313 provides an interface for the processing component 1302 and the peripheral interface module, in which the peripheral interface module may be a keyboard, click wheel, a button, etc. The buttons may include but not limited to a home button, a volume button, a start button and a lock button.

The sensor component 1314 includes one or more sensors, configured to provide various aspects of status assessment for the apparatus 1300. For example, the sensor component 1314 may detect the on/off state of the apparatus 1300 and the relative positioning of the component. For example, the component is a display and a keypad of the apparatus 1300. The sensor component 1314 may further detect the location change of the apparatus 1300 or one component of the apparatus 1300, the presence or absence of contact between the user and the apparatus 1300, the orientation or acceleration/deceleration of the apparatus 1300, and the temperature change of the apparatus 1300. The sensor component 1314 may include a proximity sensor, which is configured to detect the existence of the objects nearby without any physical contact. The sensor component 1314 may further include a light sensor such as a CMOS or CCD image sensor, which is configured to use in imaging applications. In some embodiments, the sensor component 1314 may further include an acceleration transducer, a gyroscope sensor, a magnetic sensor, a pressure sensor or a temperature sensor.

The communication component 1316 is configured for the convenience of wire or wireless communication between the apparatus 1300 and other devices. The apparatus 1300 may access wireless networks based on communication standard, such as Wi-Fi, 2G or 3G, or their combination. In an exemplary embodiment, the communication component 1316 receives broadcast signals or broadcast-related information from an external broadcast management system via a broadcast channel. In an exemplary embodiment, the communication component 1316 further includes a near field communication (NFC) module to facilitate short-range communication. For example, an NFC module may be implemented based on radio frequency identification (RFID) technology, infrared data association (IRDA) technology, ultra-wideband (UWB) technology, Bluetooth (BT) technology and other technologies.

In an exemplary embodiment, the apparatus 1300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-temporary computer readable storage medium is further provided which includes instructions, such as the memory 1304 including instructions, in which the instructions may be executed by the processor 1320 of the apparatus 1300 to complete the above methods. For example, the non-temporary computer readable storage medium may be a ROM, a random access memory (RAM), a CD-ROM, a magnetic tape, a floppy disk, an optical data storage device, etc.

In an exemplary embodiment, an apparatus for controlling a beam failure recovery procedure is provided, and includes: a processor; and a memory configured to store instructions executable by the processor; the processor is configured to: start a beam failure detection timer after beam failure is determined; trigger a beam failure recovery BEF procedure after the beam failure is determined; monitor whether the beam failure detection timer times out after the BRF procedure is triggered and before the BRF procedure completes; cancel or stop the BRF procedure when the beam failure detection timer times out.

The above processor may be further configured: the UE is in a discontinuous reception (DRX) inactive state.

The method further includes: determining to delay execution of the BRF procedure after the BRF procedure is triggered; monitoring whether the beam failure detection timer times out after the BRF procedure is triggered and before the BRF procedure completes includes: monitoring whether the beam failure detection timer times out during delaying the execution of the BRF procedure; canceling or stopping the BRF procedure when the beam failure detection timer times out includes: canceling the BRF procedure when the beam failure detection timer times out.

The above processor may be further configured: the UE is in a discontinuous reception (DRX) inactive state.

The method further includes: determining to delay execution of the BRF procedure after the BRF procedure is triggered; monitoring whether the beam failure detection timer times out after the BRF procedure is triggered and before the BRF procedure completes includes: monitoring whether the beam failure detection timer times out during executing the BRF procedure; canceling or stopping the BRF procedure when the beam failure detection timer times out includes: stopping the BRF procedure when the beam failure detection timer times out.

The above processor may be further configured: the method further includes: executing the BRF procedure immediately after the BRF procedure is triggered; monitoring whether the beam failure detection timer times out after the BRF procedure is triggered and before the BRF procedure completes includes: monitoring whether the beam failure detection timer times out during executing the BRF procedure; canceling or stopping the BRF procedure when the beam failure detection timer times out includes: stopping the BRF procedure when the beam failure detection timer times out.

The above processor may be further configured: the method further includes: starting the beam failure recovery timer when the BEF procedure starts to be executed; closing the beam failure recovery timer when the BEF procedure stops.

A computer readable storage medium is further provided. When a computer instruction in the computer readable storage medium is executed by the processor of the apparatus so that the apparatus may execute the above method for controlling a beam failure recovery procedure. The method includes: starting a beam failure detection timer after beam failure is determined; triggering a beam failure recovery BEF procedure after the beam failure is determined; monitoring whether the beam failure detection timer times out after the BRF procedure is triggered and before the BRF procedure completes; canceling or stopping the BRF procedure when the beam failure detection timer times out.

The instruction in the storage medium may further include: the UE is in a discontinuous reception (DRX) inactive state.

The method further includes: determining to delay execution of the BRF procedure after the BRF procedure is triggered; monitoring whether the beam failure detection timer times out after the BRF procedure is triggered and before the BRF procedure completes includes: monitoring whether the beam failure detection timer times out during delaying the execution of the BRF procedure; canceling or stopping the BRF procedure when the beam failure detection timer times out includes: canceling the BRF procedure when the beam failure detection timer times out.

The instruction in the storage medium may further include: the UE is in a discontinuous reception (DRX) inactive state.

The method further includes: determining to delay execution of the BRF procedure after the BRF procedure is triggered; monitoring whether the beam failure detection timer times out after the BRF procedure is triggered and before the BRF procedure completes includes: monitoring whether the beam failure detection timer times out during executing the BRF procedure; canceling or stopping the BRF procedure when the beam failure detection timer times out includes: stopping the BRF procedure when the beam failure detection timer times out.

The instruction in the storage medium may further include: the method further includes: executing the BRF procedure immediately after the BRF procedure is triggered; monitoring whether the beam failure detection timer times out after the BRF procedure is triggered and before the BRF procedure completes includes: monitoring whether the beam failure detection timer times out during executing of the BRF procedure; canceling or stopping the BRF procedure when the beam failure detection timer times out includes: stopping the BRF procedure when the beam failure detection timer times out.

The instruction in the storage medium may further include: the method further includes: starting the beam failure recovery timer when the BEF procedure starts to be executes; closing the beam failure recovery timer when the BEF procedure stops.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are referred to the appended claims.

It should be understood that the present invention is not limited to the precise structure described above and shown in the drawings, and various modifications and changes may be made without departing from its scope. The scope of the present application is only limited by the appended claims.

What is claimed is:

1. A method for controlling a beam failure recovery procedure, applied to user equipment (UE) side, comprising:
   starting a beam failure detection timer after beam failure is determined;
   triggering a beam failure recovery (BFR) procedure after the beam failure is determined;
   monitoring whether the beam failure detection timer times out after the BFR procedure is triggered and before the BFR procedure completes; and
   canceling or stopping the BFR procedure when the beam failure detection timer times out;
   wherein the UE is in a discontinuous reception (DRX) inactive state;
   wherein the method further comprises:
   determining to delay execution of the BFR procedure after the BFR procedure is triggered;
   wherein monitoring whether the beam failure detection timer times out after the BFR procedure is triggered and before the BFR procedure completes, and canceling or stopping the BFR procedure when the beam failure detection timer times out comprises one of:
   during delaying the execution of the BFR procedure, monitoring whether the beam failure detection timer times out, and canceling the BFR procedure when the beam failure detection timer times out; or
   during executing the BFR procedure responsive to reaching a delay duration, monitoring whether the beam failure detection timer times out, and stopping the BFR procedure when the beam failure detection timer times out.

2. The method of claim 1, further comprising:
   starting the beam failure recovery timer when the BFR procedure starts to be executed;
   closing the beam failure recovery timer when the BFR procedure stops.

3. The method of claim 1, further comprising:
   determining the beam failure based on signal quality of the beams.

4. The method of claim 1, wherein said triggering the BFR procedure after the beam failure is determined comprises:
   counting continuous times of the beam failures; and
   when a counting result reaches a preset times threshold, triggering the BFR procedure.

5. An apparatus for controlling a beam failure recovery procedure, comprising:
   a processor;
   a memory configured to store instructions executable by the processor;
   wherein the processor is configured to:
   start a beam failure detection timer after beam failure is determined;
   trigger a beam failure recovery (BFR) procedure after the beam failure is determined;
   monitor whether the beam failure detection timer times out after the BFR procedure is triggered and before the BFR procedure completes; and
   cancel or stop the BFR procedure when the beam failure detection timer times out;
   wherein the UE is in a discontinuous reception (DRX) inactive state;
   wherein the processor is further configured to determine to delay execution of the BFR procedure after the BFR procedure is triggered;
   wherein the processor is further configured to perform one of:
   during delaying the execution of the BFR procedure, monitoring whether the beam failure detection timer times out, and canceling the BFR procedure when the beam failure detection timer times out; or
   during executing the BFR procedure responsive to reaching a delay duration, monitoring whether the beam failure detection timer times out, and stopping the BFR procedure when the beam failure detection timer times out.

6. The apparatus of claim 5, wherein the processor is further configured to:
   determine the beam failure based on signal quality of the beams.

7. The apparatus of claim 5, wherein the processor is further configured to:
   count continuous times of the beam failures; and
   when a counting result reaches a preset times threshold, trigger the BFR procedure.

8. A non-transitory computer readable storage medium with a computer instruction stored thereon, wherein the computer instruction implements a method for controlling a beam failure recovery procedure when executed by a processor, and the method comprises:
   starting a beam failure detection timer after beam failure is determined;
   triggering a beam failure recovery (BFR) procedure after the beam failure is determined;
   monitoring whether the beam failure detection timer times out after the BFR procedure is triggered and before the BFR procedure completes; and
   canceling or stopping the BFR procedure when the beam failure detection timer times out;
   wherein the UE is in a discontinuous reception (DRX) inactive state;
   wherein the method further comprises:
   determining to delay execution of the BFR procedure after the BFR procedure is triggered;
   wherein monitoring whether the beam failure detection timer times out after the BFR procedure is triggered and before the BFR procedure completes, and canceling or stopping the BFR procedure when the beam failure detection timer times out comprises one of:
   during delaying the execution of the BFR procedure, monitoring whether the beam failure detection timer times out, and canceling the BFR procedure when the beam failure detection timer times out; or
   during executing the BFR procedure responsive to reaching a delay duration, monitoring whether the beam failure detection timer times out, and stopping the BFR procedure when the beam failure detection timer times out.

9. The non-transitory computer readable storage medium of claim 8, wherein the method further comprises:
starting the beam failure recovery timer when the BFR procedure starts to be executed;
closing the beam failure recovery timer when the BFR procedure stops.

10. The non-transitory computer readable storage medium of claim 8, wherein, the method further comprises:
determining the beam failure based on signal quality of the beams;
wherein triggering the BFR procedure after the beam failure is determined comprises:
counting continuous times of the beam failures;
when a counting result reaches a preset times threshold, triggering the BFR procedure.

\* \* \* \* \*